US008510710B2

(12) United States Patent
Harren et al.

(10) Patent No.: US 8,510,710 B2
(45) Date of Patent: Aug. 13, 2013

(54) SYSTEM AND METHOD OF USING POOLED THREAD-LOCAL CHARACTER ARRAYS

(75) Inventors: Arne Harren, Heidelberg (DE); Norbert Kuck, Karlsruhe (DE); Jens Lieberum, Ketsch (DE); Ralf Schmelter, Wiesloch (DE)

(73) Assignee: SAP AG, Walldorf (DE)

( * ) Notice: Subject to any disclaimer, the term of this patent is extended or adjusted under 35 U.S.C. 154(b) by 1141 days.

(21) Appl. No.: 12/246,314

(22) Filed: Oct. 6, 2008

(65) Prior Publication Data

US 2010/0088675 A1 Apr. 8, 2010

(51) Int. Cl.
*G06F 9/44* (2006.01)
(52) U.S. Cl.
USPC .......................................................... 717/118
(58) Field of Classification Search
USPC ................................. 717/106–119
See application file for complete search history.

(56) References Cited

U.S. PATENT DOCUMENTS 6,523,168 B1 2/2003 Arnold et al.
2007/0067511 A1 3/2007 Khawand et al.

FOREIGN PATENT DOCUMENTS

EP 0817044 A2 7/1998

OTHER PUBLICATIONS

Sestoft, "Java performance—Reducing time and space consumption", Apr. 2005, IT University of Copenhagen, Denmark, 11 pages.*
Araf Karsh, "Remembering the Tiger (Java 5.0)—Part 1", Aug. 2006, http://yourjava.blogspot.com/2006_08_01_archive.html—Java and Technology—The Bit and the Bytes, 6 pages.*
Office Action (from a corresponding foreign application), EP 09 009 829.4-2211, mailed May 17, 2011.
Chapter 3, "The Structure of the Java Virtual Machine," from the Java(TM) Virtual Machine Specification, 1999 Sun Microsystems, Inc.
From Wikipedia, "StringBuffer and StringBuilder." http://en.wikipedia.org/wikiStringBuilder (Jun. 1, 2008).
Reliability, Availability and Serviceability. SAP Documentation. http://help.sap.com/saphelp_nwce10/helpdata/en/38/37989164eb42608b08f77965f9fc06/c . . . Aug. 27, 2008.
Architecture of SAP JVM. SAP Documentation. http://help.sap.com/saphelp_nwce10/helpdata/en/c8/649700061e438db93ff5f31 32c7b91/c . . . Aug. 27, 2008.
Code Generation and Optimization. SAP Documentation. http://help.sap.com/saphelp_nwce10/helpdata/en/82/044549904724eb cbb09dbbb33fcb78f/c . . . Aug. 27, 2008.
Memory Management (Garbage collection). SAP Documentation. http://help.sap.com/saphelp_nwce10/helpdata/en/2a/1cf5a6737 c42158048819a3621d205/c . . . Aug. 27, 2008.

(Continued)

*Primary Examiner* — Ted T Vo
(74) *Attorney, Agent, or Firm* — Fountainhead Law Group PC

(57) ABSTRACT

In one embodiment the present invention includes a virtual machine environment that performs string operations using borrowed character arrays. A method includes creating a character array area that is related to a thread. The method further includes detecting a string operation which qualifies for using a character array from the thread's character array area. The method further includes borrowing a character array of a character array slot of the character array area. The method further includes performing the string operation using the character array having been borrowed. The method further includes returning the character array to the character array slot when the string operation has been performed. In this manner, the time and memory consumed by string operations may be reduced.

20 Claims, 8 Drawing Sheets

(56) References Cited

OTHER PUBLICATIONS

About the Java Technology (The Java(TM) Tutorials—Getting Started, "The Jave Programming Language," (Last updated Feb. 14, 2008).

Anonymous, "StringBuilder/StringBuffer—toString() copies the character array" Internet Article, [online] Mar. 14, 2005, p. 1, XP002547597.

David Daney, "The problems with StringBuilders . . . " Internet Article, [online] Jan. 3, 2007, p. 1, XP002547598, retrieved from the Internet: URL: http://web.archive.org/web/20070103013525/http://gcc.gnu.org/ml/java/2005-10/msg00006.html> [retrieved on Sep. 24, 2009].

European Search Report (from a corresponding foreign application), EP 09009829.4, mailed Oct. 13, 2009.

\* cited by examiner

```
class A { ...
    private B value;
    public String toString() {
        return "[value=" + value + "]"; // new StringBuilder()...append(value.toString())...
    }
} class B { ...
    private int I;
    public String toString() {
        return "<" + I + ">"; // new StringBuilder()...append(i)...
    }
}
```

FIG. 5

```
class Thread { ...

/**
     * Tries to allocate a TLCA slot of the given capacity.
     *
     * @param capacity the required capacity of the TLCA slot
     * @return a TLCA slot which has at least the required capacity, or
     *         <tt>null</tt> on failure
     */
    static char[] tlcaTryAlloc(int capacity) { ... }

/**
     * Frees a TLCA slot which was previously allocated with tlcaTryAlloc.
     *
     * @param slot the TLCA slot to free
     */
    static native void tlcaFree(char[] slot) { ... }

```
class Thread { ...
    /**
     * Tries to allocate a TLCA slot of the given capacity.
     *
     * @param capacity the required capacity of the TLCA slot
     * @return a TLCA slot which has at least the required capacity, or
     *         <tt>null</tt> on failure
     */
    static char[] tlcaTryAlloc(int capacity) {
        return null; // TLCA slots are allocated by Just-in-time compiled code only
    }
    ... }
```

FIG. 7

```
abstract class AbstractStringBuilder { ...
    /**
     * The value is used for character storage.
     */
    char value[];

/**
     * The count is the number of characters used.
     */
    int count;

/**
     * The type of the character storage.
     */
    transient int type;  // = 0 = TYPE_UNSHARED, by default
    static final int TYPE_UNSHARED = 0;  // value is owned by the AbstractStringBuilder
    static final int TYPE_SHARED   = 1;  // value is shared with a String
    static final int TYPE_TLCA     = 2;  // TLCA slot allocated : capacity information
    ... }
```

FIG. 8

```
abstract class AbstractStringBuilder { ...
    /**
     * Creates an AbstractStringBuilder of the specified capacity.
     */
    AbstractStringBuilder(int capacity) {
        value = Thread.tlcaTryAlloc(capacity);
        if (value != null) {
            // TLCA slot allocation was successful, remember initial capacity.
            type = TYPE_TLCA + capacity;
            return;
        }
        // normal allocation.
        value = new char[capacity];
    }
    ...
}
```

FIG. 9

```
class StringBuilder/StringBuffer { ...
    /**
     * Returns a string representing the data in this sequence. ...
     */
    (synchronized) public String toString() {
        if (type >= TYPE_TLCA) {
            // character storage is a TLCA slot, create a copy, free the slot,
            // and share the copy.
            char newValue[] = new char[count];
            System.arraycopy(value, 0, newValue, 0, count);
            Thread.tlcaFree(value);
            value = newValue;
            type = TYPE_SHARED;
            return new String(0, count, value); // constructor shares the array
        } else if (type == TYPE_SHARED) {
            // character storage is already shared, share again.
            return new String(0, count, value); // constructor shares the array
        } else
            // character storage is not shared, create a copy.
            return new String(value, 0, count);
    }
    ...
}
```

FIG. 10

```
private static final String SEPARATOR = "-";

public static String asIdString(int num, String namespace, String property) {
    return namespace + num + SEPARATOR + property + num;
}
```

FIG. 11A

```
private static final String SEPARATOR = "-";

public static String asIdString(int num, String namespace, String property) {
    return new StringBuilder()
        .append(namespace).append(num).append(SEPARATOR).append(property).append(num)
        .toString();
}
```

FIG. 11B

```
private static final String SEPARATOR = "-";

public static String asIdString(int num, String namespace, String property) {
    return new StringBuilder(namespace)
        .append(num).append(SEPARATOR).append(property).append(num)
        .toString();
}
```

FIG. 11C

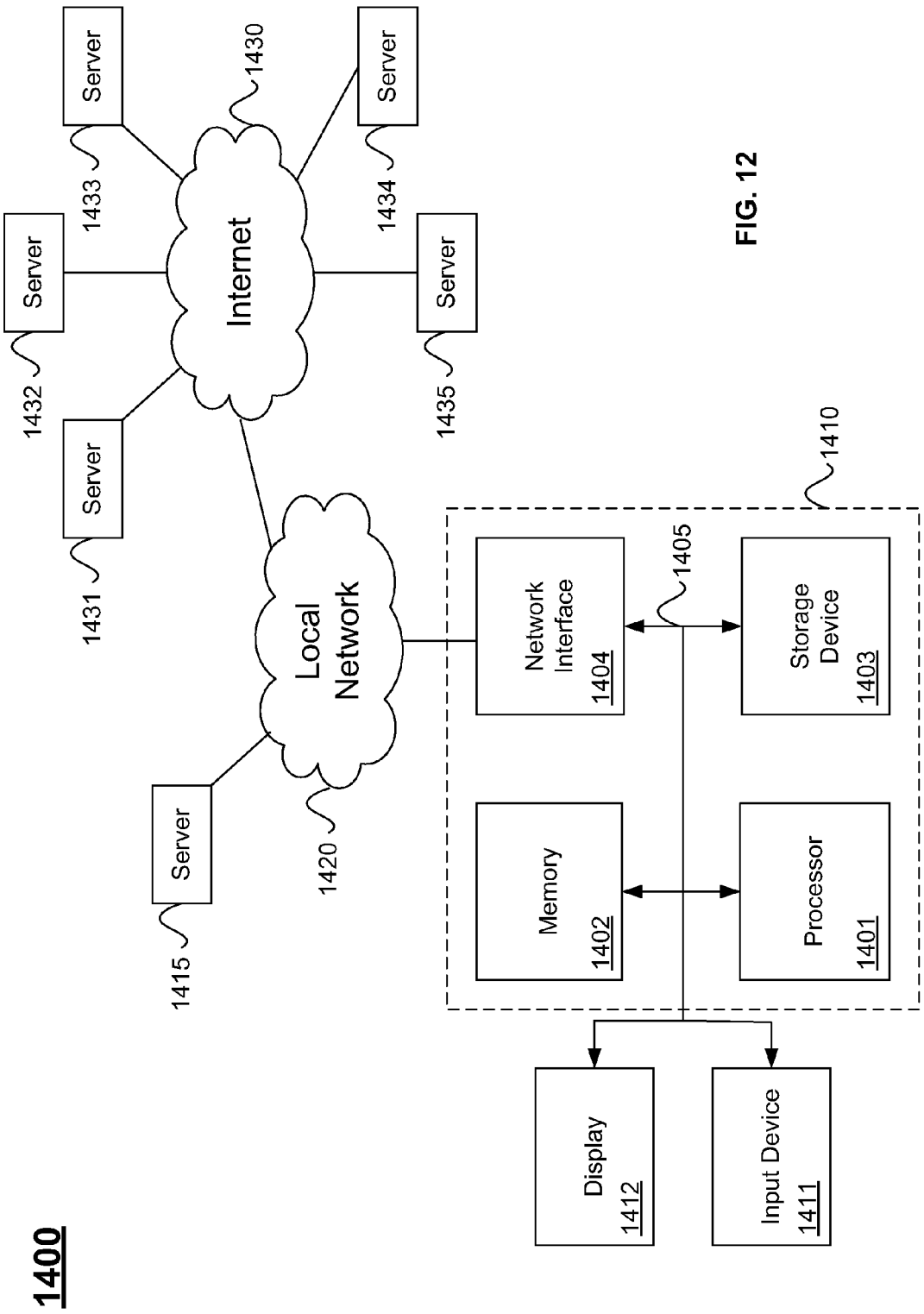

SYSTEM AND METHOD OF USING POOLED THREAD-LOCAL CHARACTER ARRAYS

CROSS REFERENCE TO RELATED APPLICATIONS

Not Applicable.

BACKGROUND

The present invention relates to Java™ virtual machines, and in particular, to string operations in Java™ virtual machines.

Unless otherwise indicated herein, the approaches described in this section are not prior art to the claims in this application and are not admitted to be prior art by inclusion in this section.

The Java™ programming language is a high-level language that may be characterized by all of the following buzzwords: simple, object oriented, distributed, multi-threaded, dynamic, architecture neutral, portable, high performance, robust, and secure. Further details regarding each of these buzzwords can be found in "The Java™ Language Environment" by James Gosling and Henry McGilton.

In the Java™ programming language, source code is first written in plain text files ending with the .java extension. These source files are then compiled into .class files by a Java™ compiler such as javac. A .class file does not contain code that is native to a physical processor; it instead contains bytecodes—the machine language of the Java™ Virtual Machine (Java™ VM). A launcher tool (java.exe or other Java™ runtime environment) then runs the application with an instance of the Java™ VM.

The Java™ VM runs the application by converting the Java™ bytecodes into native instructions that are specific to the actual operating system and processor of the computing device. Since the bytecode is designed to be portable, but the Java™ VM is specific to the actual computing device, the Java™ VM may be modified in order to perform a wider variety of tasks yet still remain compliant with the Java™ standard.

Java™ has three core classes for string storage and operations: the String class, the StringBuffer class, and the StringBuilder class. The String class is Java's™ standard way to handle text. Any given String in Java™ is an immutable object, which means its state cannot be changed. A String has an array of characters and information about where in the array the string characters start and end. A character array (in the remainder of this document sometimes abbreviated as "char[capacity]") is a Java™ object that is located on a heap. It is also, for example, used in String and StringBuilder objects. The character array may be larger than required for the string. Whenever a String must be manipulated, any changes require the creation of a new String (which in almost all cases involves the creation of a new array of characters, and copying of the original array). (Note that in some cases, many implementations of String.substring( ) share the character array with the result string, and just use a different start and offset index; this is possible because strings and their arrays are immutable.) This happens even if the original String's value or intermediate Strings used for the manipulation are not kept.

A StringBuffer, like a String, has an array to hold characters. The StringBuffer, however, is mutable (its state can be altered). Its array of characters is not necessarily completely filled (as opposed to a String, whose array is normally the exact required length for its contents). Thus, it has the capability to add, remove, or change its state without creating a new object (and without the creation of a new array, and array copying). The exception to this is when its array is no longer of suitable length to hold its content. In this case, it is required to create a new array, and copy contents.

The StringBuilder class differs from StringBuffer in that StringBuilder is unsynchronized. When only a single thread at a time will access the object, using a StringBuilder is more efficient than using a StringBuffer.

SUMMARY

Embodiments of the present invention improve the efficiency of string operations in a computing environment. In one embodiment, the present invention includes a virtual machine environment that performs string operations using borrowed character arrays. A method includes creating a character array area that is related to a thread. The method further includes detecting a string operation that qualifies for using a character array from the character array area of the thread. The method further includes borrowing a character array of a character array slot of the character array area. The method further includes performing the string operation using the character array having been borrowed. The method further includes returning the character array to the character array slot when the string operation has been performed.

In one embodiment, an apparatus includes a processor and a memory and executes instructions for performing string operations in a virtual machine environment. The apparatus includes data structures and character array areas. Each of the data structures is associated with a corresponding one of a plurality of threads in the virtual machine environment. Each of the character array areas is associated with a corresponding one of the plurality of data structures. The apparatus then performs processing that includes the method described above.

In one embodiment, a computer program is recorded on a computer-readable medium. The computer program controls a data processing apparatus to execute processing that includes the method described above.

According to a further embodiment, a garbage collection operation may be performed to return the borrowed character array.

According to a further embodiment, the character array area includes character array slots. Each of the character array slots points to a corresponding character array.

In this manner, the time and memory consumed by string operations may be reduced.

The following detailed description and accompanying drawings provide a better understanding of the nature and advantages of the present invention.

BRIEF DESCRIPTION OF THE DRAWINGS

FIGS. 5-10 are example code segments according to an embodiment of the present invention.

FIGS. 11A-11C are code segments illustrating memory savings according to an embodiment of the present invention.

FIG. 12 is a block diagram of an example computer system and network for implementing embodiments of the present invention.

DETAILED DESCRIPTION

Described herein are techniques for creating and using thread-local character arrays. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
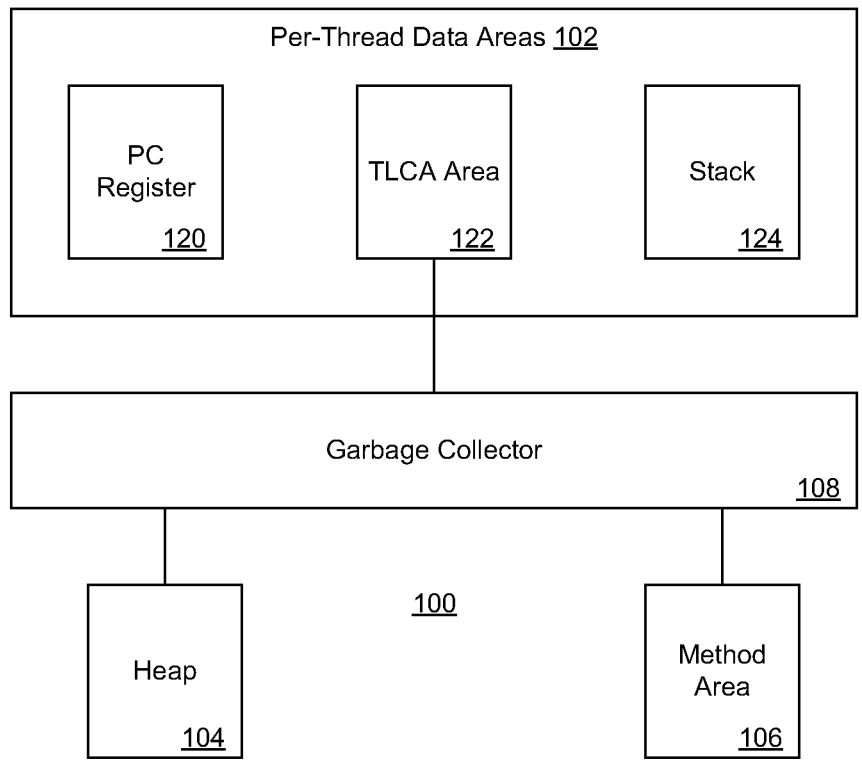
FIG. 1 is a block diagram of a Java™ virtual machine according to an embodiment of the present invention.

FIG. 1 is a block diagram of a Java™ virtual machine 100 according to an embodiment of the present invention. The Java™ virtual machine may be implemented by physical computing devices as further detailed below. The Java™ virtual machine 100 can support many threads of execution at once.

The Java™ virtual machine 100 includes per-thread data areas 102, a heap 104, a method area 106, and a garbage collector 108. The Java™ virtual machine 100 defines various runtime areas that are used during execution of a program. Some of these data areas are created when the Java™ virtual machine 100 starts up and are destroyed only when the Java™ virtual machine 100 exits. Other data areas are per thread. Per-thread data areas 102 are created when a thread is created and destroyed when the thread exits. The heap 104, method area 106 and garbage collector 108 are used by all threads executed by the Java™ virtual machine 100. Each of the per-thread data areas 102 is associated with a corresponding thread.

The heap 104 is shared among all Java™ virtual machine threads. The heap 104 is the runtime data area from which memory for all class instances and arrays is allocated.

The heap 104 is created on start-up of the virtual machine 100. Heap storage for objects is reclaimed by the garbage collector 108; objects need not be explicitly deallocated. The Java™ virtual machine 100 assumes no particular type of automatic storage management system, and the storage management technique may be chosen according to the implementor's system requirements. The heap 104 may be of a fixed size, may be expanded as required by the computation, and may be contracted if a larger heap becomes unnecessary. The memory for the heap 104 does not need to be contiguous.

The Java™ virtual machine 100 may provide the programmer or the user control over the initial size of the heap 104, as well as (when the heap 104 can be dynamically expanded or contracted) control over the maximum and minimum heap size.

The following exceptional condition is associated with the heap 104. If a computation requires more heap than can be made available by the automatic storage management system, the Java™ virtual machine 100 throws an OutOfMemoryError.

The method area 106 is shared among all Java™ virtual machine threads. The method area 106 is analogous to the storage area for compiled code of a conventional language or analogous to the "text" segment in a UNIX process. The method area 106 stores per-class structures such as the runtime constant pool, field and method data, and the code for methods and constructors, including the special methods used in class and instance initialization and interface type initialization.

The method area 106 is created on start-up of the virtual machine 100. The method area 106 may be logically part of the heap 104. However, some implementations of the virtual machine 100 may choose not to either garbage collect or compact the method area 106, in which case the method area 106 may be shown as separate from the heap 104. The method area 106 may be of a fixed size or may be expanded as required by the computation and may be contracted if a larger method area becomes unnecessary. The memory for the method area 106 does not need to be contiguous.

The Java™ virtual machine 100 may provide the programmer or the user control over the initial size of the method area 106, as well as (in the case of a varying-size method area 106) control over the maximum and minimum size of the method area 106.

The following exceptional condition is associated with the method area 106. If memory in the method area 106 cannot be made available to satisfy an allocation request, the Java™ virtual machine 100 throws an OutOfMemoryError.

The garbage collector 108 performs automatic memory management for the Java™ virtual machine 100. The programmer determines when objects are created, and the garbage collector 108 is responsible for managing the object's lifecycle. The program or other objects can reference an object by holding a reference to it (which, from a low-level point of view, is its address on the heap 104). When no references to an object remain, the unreachable object is eligible for release by the garbage collector 108—it may be freed automatically by the garbage collector 108 at any time. Memory leaks may still occur if a programmer's code holds a reference to an object that is no longer needed; in other words, they can still occur but at higher conceptual levels. The garbage collector 108 interacts with the heap 104, the method area 106, and the thread-local character arrays 122.

Each of the per-thread data areas 102 includes a program counter register 120, a thread-local character array area 122, and a stack 124. (That is, each thread is associated with a corresponding program counter register 120, thread-local character array area 122, and stack 124 in one of the per-thread data areas 102 that is associated with that thread.)

Each program counter register 120 stores the program counter for a particular thread. Each Java™ virtual machine thread has its own program counter register 120. At any point, each Java™ virtual machine thread is executing the code of a single method, referred to as the current method for that thread. If that method is not native, the program counter register 120 contains the address of the Java™ virtual machine instruction currently being executed. If the method currently being executed by the thread is native, the value of the program counter register 120 is undefined. The program counter register 120 is wide enough to hold a returnAddress or a native pointer on the specific platform.

Each stack 124 operates as a stack for a particular thread. Each Java™ virtual machine thread has a private Java™ virtual machine stack 124, created at the same time as the thread. The Java™ virtual machine stack 124 stores frames. The Java™ virtual machine stack 124 is analogous to the stack of a conventional language such as C: it holds local variables and partial results, and plays a part in method invocation and return. Because the Java™ virtual machine stack 124 need not be manipulated directly except to push and pop frames, frames may be heap allocated. The memory for a Java™ virtual machine stack 124 does not need to be contiguous.

The Java™ virtual machine stack 124 may be either created at a fixed size or modified to dynamically expand and contract as required by the computation. If the Java™ virtual machine stack 124 is of a fixed size, the size may be chosen independently when the stack 124 is created. A Java™ virtual machine implementation may provide the programmer or the user control over the initial size of Java™ virtual machine stack 124, as well as, in the case of dynamically expanding or contracting Java™ virtual machine stacks, control over the maximum and minimum sizes.

The following exceptional conditions are associated with the Java™ virtual machine stack 124. First, if the computation in a thread requires a larger Java™ virtual machine stack 124 than is permitted, the Java™ virtual machine 100 throws a StackOverflowError. Second, if the Java™ virtual machine stack 124 can be dynamically expanded, and expansion is attempted but insufficient memory can be made available to effect the expansion, or if insufficient memory can be made available to create the initial Java™ virtual machine stack 124 for a new thread, the Java™ virtual machine 100 throws an OutOfMemoryError.

Thread-Local Character Arrays

In general, a thread local character array (TLCA) is a special case of a character array that is owned by a thread and borrowed by StringBuilders (and other string classes). From the Java™ perspective, it is a normal character array, because otherwise it could not be used by StringBuilders. A thread owns a number of TLCAs. These are stored in an array. The positions in this array may be referred to as "TLCA slots". The array itself may be referred to as a "TLCA area". The character arrays for the TLCA slots may be located in any part of the Java™ virtual machine, according to design choice. According to one embodiment, they are not part of the per-thread data area 102 but are actually located on the heap 104. They may be found by following the pointer from the TLCA slot. The label "122" may be used to refer to the TLCAs themselves as well as to the TLCA area (that contains the TLCAs).

The thread-local character arrays (TLCAs) 122 are created for each thread. In general, the thread-local character arrays 122 improve the efficiency of string operations in Java™ programs. The existence of TLCAs is an internal optimization on the Java™ VM level and need not be exposed on the Java™ API level. Compliance with Java™ API standards is thus not affected. The garbage collector 108 interacts with the thread-local character arrays 122 to avoid memory leaks that may result in the event that for example a StringBuilder or StringBuffer is reclaimed by the garbage-collector without returning a borrowed thread-local character array.

According to one embodiment of the present invention, an implementation of StringBuffer and StringBuilder using thread-local character arrays 122 reduces consumed temporary memory, as compared to an implementation of StringBuffer and StringBuilder without TLCAs. According to one embodiment of the present invention, an implementation of StringBuffer and StringBuilder using thread-local character arrays 122 reduces the time consumed in string operations, as compared to using StringBuffer and StringBuilder without TLCAs.

According to one embodiment of the present invention, the thread-local character arrays 122 may be used whenever a StringBuilder (or StringBuffer) object is created, is expanded by adding more characters, and is converted back into a string by calling toString within one method. Such situations may be indicated, for example, when one or more of the following code sequences are present. According to one embodiment of the present invention, the thread-local character arrays 122 may be used when the "new StringBuilder( ).append( ). ... .append( ).toString( )" code sequence has been produced by the Java™ compiler. According to one embodiment of the present invention, the thread-local character arrays 122 may be used when the code sequences "append(char)", "append(String)", and "append(Object)" have been produced by the Java™ compiler. According to one embodiment of the present invention, the thread-local character arrays 122 may be used when the "append( ). ... .indexOf( ).... .insert( ).... .toString( )" code sequence has been produced by the Java™ compiler.

According to one embodiment of the present invention, the thread-local character arrays 122 may be used without making any changes to the application coding. According to one embodiment of the present invention, the thread-local character arrays 122 do not require any changes to the Java™ APIs. According to one embodiment of the present invention, the thread-local character arrays 122 generate only a small amount of overhead, if any, when evaluating other code sequences than those described above.

Figure 2:
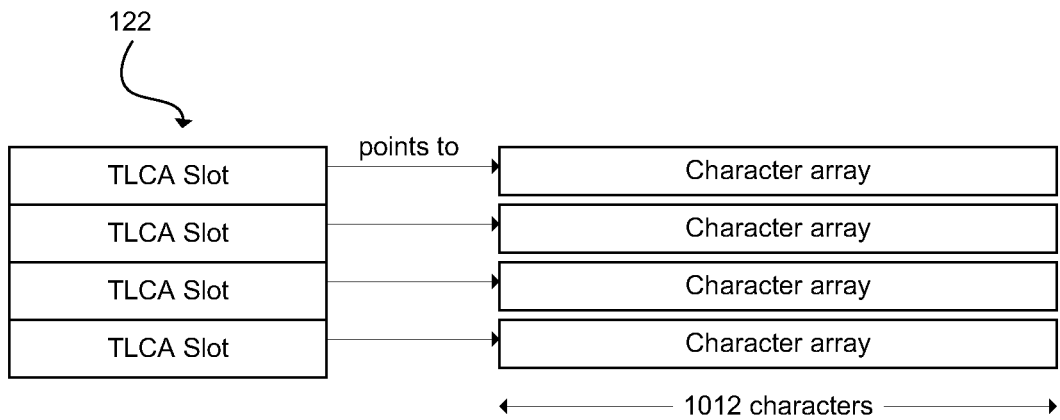
FIG. 2 illustrates details of a thread-local character array area according to an embodiment of the present invention.

FIG. 2 illustrates details of a thread-local character array area 122 according to an embodiment of the present invention. Each slot contains a reference (pointer) to a character array (which may for example be 1024 characters long). According to one embodiment, the number of TLCA slots (i.e., the size of the thread-local character array area 122) is four. According to one embodiment, each TLCA slot contains a thread local character array (TLCA) with a size of 1012 characters. The number of TLCA slots, and the size of the thread-local character arrays 122 may be adjusted as desired. For good results, the number of TLCA slots should equal the maximum recursion level expected for nested operations on StringBuilders or StringBuffers plus the expected number of "long-term-borrowers". The size of each TLCA should roughly equal the expected average number of characters stored in StringBuilders and StringBuffers. Constraints that may be considered include the anticipated size and frequency of string operations, the memory and storage capacity of the device implementing the Java™ virtual machine 100, the expected number of threads and other programming factors. A typical configuration may use four TLCA slots with 1024 characters each. In an environment featuring long strings and little recursion, two TLCA slots with 4096 characters each may be more appropriate.

More than one TLCA slot can be required for two reasons: First, it is possible that a TLCA is borrowed for a long time (e.g. if a StringBuilder is created, appends characters, borrows a TLCA, but never executes toString( ) before being reclaimed by the garbage collector much later). Second, application code may append the content of a temporarily constructed StringBuilder to another StringBuilder in a recursive fashion, requiring one TLCA per recursion level (see FIG. 5 for a typical example).

The actual memory consumption for TLCA slots, character arrays and StringBuilders is highly implementation and platform dependent. According to one embodiment running on a platform where pointers are 64 bits wide and need 8-byte alignment, a StringBuilder object consists of two Java™ VM internal header fields (2*8 bytes), one Java™ object reference field (8 bytes), one Java™ integer field (4 bytes), and one alignment field (4 bytes). A character array object consists of two Java™ VM internal header fields (2*8 bytes), one Java™ integer field (4 bytes), one alignment field (4 bytes), the character array (capacity*2 bytes), and alignment to the next 8 bytes. A String object consists of two Java™ VM internal header fields (2*8 bytes), one Java™ object reference field (8 bytes), three Java™ integer fields (3*4 bytes), and one alignment field (4 bytes).

When the toString( ) method is called on a StringBuilder (or StringBuffer), the implementation generally has two options: One approach is to share the existing character array with the newly created result String (saving the time and space for a copy). In this case, the StringBuilder may have to perform a copy-on-write operation later in the (typically unlikely) event that it is modified again afterwards. The other approach is to always copy the character array when toString( ) is called. Earlier implementations of Java™ VMs have employed the sharing strategy, but experience has shown that this frequently results in a waste of memory for the following reason: When StringBuilders expand their character arrays, they typically allocate character arrays with some extra capacity, anticipating further growth. When the sharing strategy is used, these larger arrays are passed on to the result String, resulting in many Strings having a character array larger than required to store the string. Hence, the sharing strategy was abandoned in typical state-of-the art Java™ VMs, arguing that copying character arrays is cheaper than wasting memory resulting from sharing. When toString( ) is called on a StringBuilder that uses a TLCA, the advantages of both approaches are combined: The characters must be copied from the TLCA to the String anyway (because the TLCA must be returned). Both the String and the StringBuffer need to retain the char array, but in this case the char array always has exactly the desired size, so sharing does not introduce additional memory overhead.

In general, the Java™ virtual machine 100 uses the thread-local character arrays 122 as follows. In place of allocating a new character array, the StringBuilder or StringBuffer implementation within the Java™ virtual machine 100 borrows a TLCA slot as initial temporary storage. The StringBuilder/Buffer implementation then returns the borrowed TLCA slot when toString( ) is called or when a higher capacity of the temporary storage is desired. In addition, the Java™ virtual machine 100 allows the garbage collector 108 to interact with the thread-local character arrays 122 to avoid memory leaks for StringBuilders or StringBuffers that are reclaimed by the garbage collector 108 without returning borrowed TLCA slots.

Figure 3:
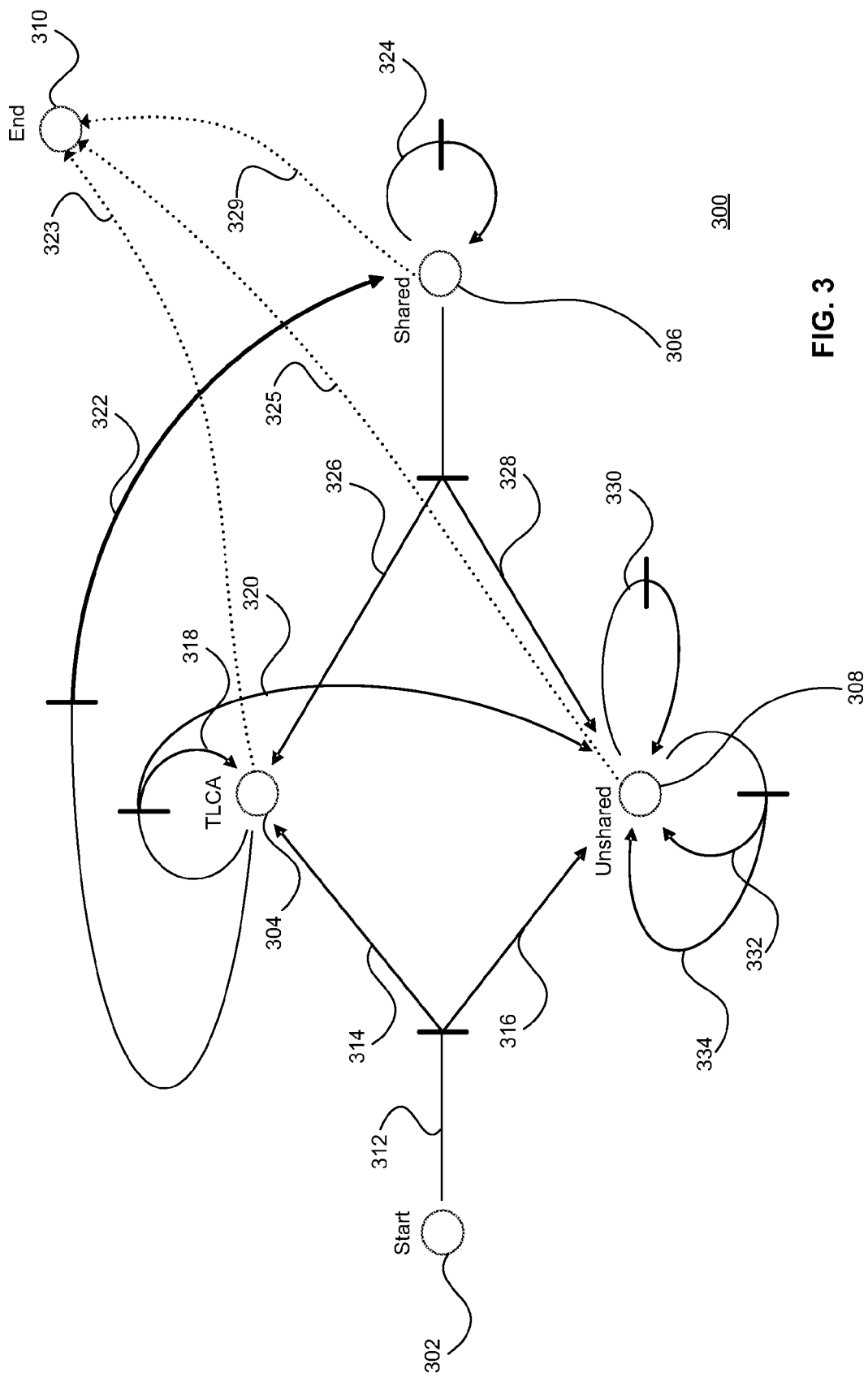
FIG. 3 is a state transition diagram that illustrates the states of a StringBuilder and borrowed TLCA slots according to an embodiment of the present invention.

FIG. 3 is a state transition diagram that illustrates the states of a StringBuilder and borrowed TLCA slots 300 according to an embodiment of the present invention. The state transition diagram 300 includes a starting state 302, a TLCA state 304, a shared state 306, unshared state 308, and a garbage-collected end state 310. These states and their transitions may be implemented in a virtual machine such as the Java™ virtual machine 100 (see FIG. 1). Although the state transition diagram is directed toward a StringBuilder and borrowed TLCA slots, similar states may be implemented for a StringBuffer and borrowed TLCA slots.

In the starting state 302, the virtual machine is performing its standard processing, a discussion of which is omitted for brevity. At transition 312, the virtual machine is directed to create a new StringBuilder or StringBuffer object with a defined capacity. For discussion purposes, we will assume it is a StringBuilder object. At transition 314, if there is a TLCA slot available and the TLCA slot has the desired capacity, the StringBuilder borrows a TLCA slot and transitions to the TLCA state 304. At transition 316, if there is no TLCA slot available or the desired capacity exceeds that of an available TLCA slot, the virtual machine creates a new char[capacity] for an internal (unshared) array and transitions to the unshared state 308.

In the TLCA state 304, the virtual machine is performing String operations on a StringBuilder using the borrowed TLCA slot. At transition 318, the virtual machine performs a string operation such as append( ), insert( ), indexOf( ), delete( ), replace( ), reverse( ), substring( ), etc. using the borrowed TLCA slot, and the capacity of the borrowed TLCA slot is sufficient, so the virtual machine returns to the TLCA state 304. At transition 320, the virtual machine performs a string operation using the borrowed TLCA slot, but the capacity is not sufficient, so the virtual machine returns the borrowed TLCA slot, creates a new private character array of the desired capacity, and transitions to the unshared state 308. At transition 322, the virtual machine is directed to perform a toString( ) operation; the virtual machine creates a new char [currentlength] for the result string, returns the TLCA slot, shares the new array corresponding to the result string, and transitions to the shared state 306. At transition 323, the garbage collector detects that the StringBuilder is no longer used, returns the borrowed TLCA slot, reclaims the StringBuilder's memory and transitions to the end state 310.

In the shared state 306, the virtual machine is performing String operations on a StringBuilder that uses a character array that is shared with a String object. At transition 324, the virtual machine is directed to perform a toString( ) operation; the virtual machine shares the character array again with the result String object, and returns to the shared state 306. At transition 326, the virtual machine is directed to perform a string operation such as append( ), insert( ), delete( ), etc. and there is a TLCA slot available; the virtual machine borrows a TLCA slot and transitions to the TLCA state 304. (The string operation is then performed as described in the TLCA state 304.) At transition 328, the virtual machine is directed to perform a string operation and there is no TLCA slot available; the virtual machine creates a new private character array of the desired capacity and transitions to the unshared state 308. At transition 329, the garbage collector 108 detects that the StringBuilder is no longer used, reclaims the StringBuilder's memory and transitions to the end state 310.

In the unshared state 308, the virtual machine performs string operations on a StringBuilder that uses a character array that is not shared with a String object. At transition 330, the virtual machine is directed to perform a toString( ) operation; the virtual machine creates a new character array of a length equal to the number of used characters in the StringBuilder (possibly smaller than the StringBuilders current capacity) for the exclusive, unshared use of the result string, copies the used characters to the new array, and returns to the unshared state 308. At transition 332, the virtual machine performs a string operation using the unshared array, and the capacity of the unshared array is sufficient, so the virtual machine returns to the unshared state 308. At transition 334, the virtual machine performs a string operation using the unshared array, but the capacity is not sufficient, so the virtual machine creates a new character array of the desired capacity, and returns to the unshared state 308. (According to an alternative embodiment, at transition 334, a similar decision to that made at transitions 326 and 328 is made: If the condition for transition 334 is met (that is, a string operation but insufficient capacity), the virtual machine checks whether a TLCA slot is available; if so, the virtual machine transitions to state 304 (similar to transition 326), and if not, the virtual machine transitions back to the unshared state 308.) At transition 325, the garbage collector detects that the StringBuilder is no longer used, reclaims the StringBuilder's memory and transitions to the end state 310.

In the end state 310, the StringBuilder has been garbage collected and its memory has been reclaimed. The garbage collector 108 (see FIG. 1) may perform the garbage collection and memory reclamation operation.

Figure 4:
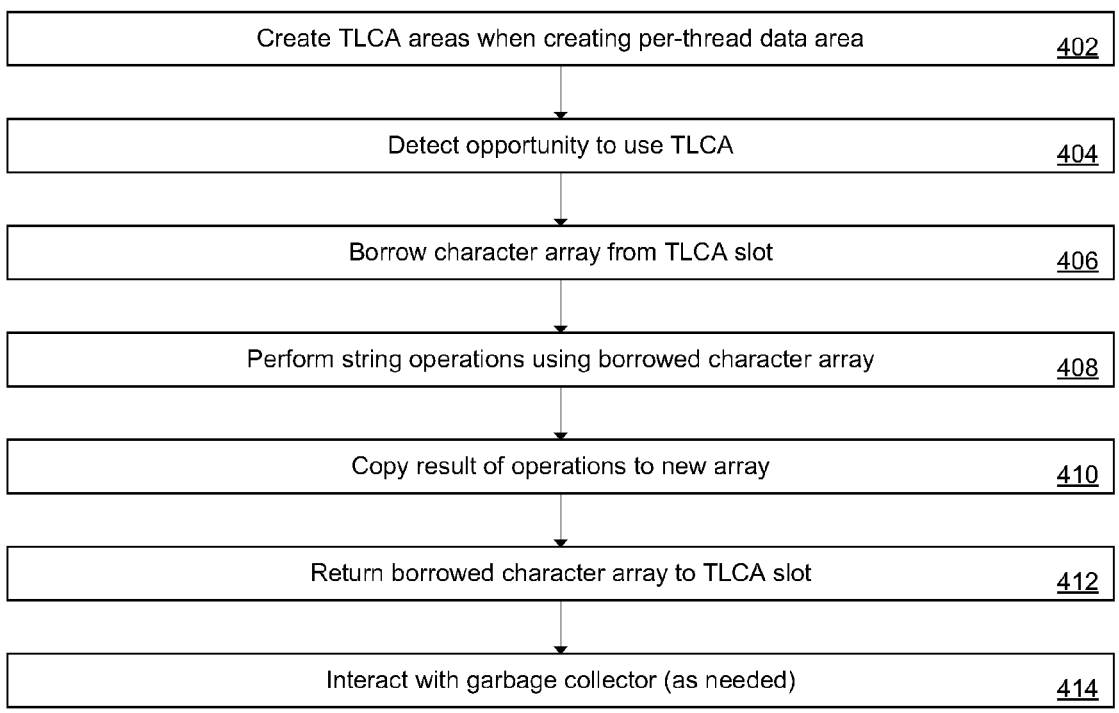
FIG. 4 is a flow diagram of a method of performing string operations using thread local character arrays according to an embodiment of the present invention.

FIG. 4 is a flow diagram of a method 400 of performing string operations using thread-local character arrays according to an embodiment of the present invention. The method 400 may be implemented in a virtual machine environment such as the Java™ virtual machine 100 (see FIG. 1). As such, the virtual machine may be performing other activities that are unrelated to the aspects of the present invention; a discussion of the other activities is omitted for brevity.

In step 402, the virtual machine creates a thread. As part of the thread, the virtual machine creates a TLCA area with a number of TLCAs (thread-local character arrays). Further details are provided above (see the thread-local character array area 122 in FIG. 1 and related discussion). The thread may be one of many threads already running on the virtual machine. Each thread must have its own thread-local character arrays according to one embodiment. An alternative embodiment creates only the TLCA area when the thread is created, and creates the actual character arrays on demand only when they are needed. The number of TLCAs per thread may also be varied dynamically (giving more TLCAs to threads that have shown greater need). The size of the arrays may also be varied.

In step 404, the virtual machine detects an opportunity to use a character array from the thread's character array area to perform a string operation on a StringBuilder or StringBuffer. In general, the opportunity is satisfied when the string operation qualifies for using the character array. The opportunity may be that the virtual machine is instructed for a given thread to perform operations on a string such as "append( ). ... .indexOf( ). .... .insert( ).... .toString( )" (see previous discussion regarding code sequences). The opportunity may be that a new StringBuilder object has been created (see transition 312 in FIG. 3). Various optimization strategies may be implemented to decide whether or not to use TLCAs. The objective is to prefer using TLCAs in situations where the StringBuilder is used for a short time (as is typical for string operations). The VM may analyze the byte code of the currently executing method and decide not to use TLCAs (even though the capacity is sufficient) if there are indications that the StringBuilder is not just used temporarily. One way to detect that a StringBuilder is not just used temporarily is that it "escapes" the current method, i.e. that it is returned as a method result, stored into a member variable or a static variable, or passed as an argument to other methods. Escape analysis is a known technique for the optimization of Java™ VMs.

In step 406, the virtual machine borrows a TLCA slot to perform the string operation. Further details regarding borrowing the TLCA slot, and related contingencies, are discussed above regarding FIG. 3 (and for brevity are not repeated).

In step 408, the virtual machine performs a string operation using the borrowed TLCA slot. Further details regarding using the TLCA slot, and related contingencies, are discussed above regarding FIG. 3 (note the TLCA state 304 and the shared state 306).

In step 410, the virtual machine creates a new array to store the result of the string operation (see step 408), and stores the result of the string operation in the new array. The new array may be a shared array. A shared array means that the character array is shared with the string. Further details are discussed above regarding FIG. 3 (see the transition 322).

In step 412, the virtual machine returns the borrowed TLCA slot. Further details regarding returning the TLCA slot, and related contingencies, are discussed above regarding FIG. 3 (note the transition 322).

In step 414, the virtual machine allows the garbage collector to interact with the thread-local character arrays. The garbage collector needs to detect when a StringBuilder or StringBuffer object is reclaimed that is still using a borrowed TLCA slot. Otherwise, memory leaks might result from using the thread-local character arrays. Further details are discussed above regarding transition 323 in FIG. 3, the garbage collector 108 in FIG. 1, and related discussion.

Details Regarding Java™ Virtual Machine

As discussed above, embodiments of the present invention may be implemented as part of a Java™ virtual machine. The following description elaborates on the features of a Java™ virtual machine that implements embodiments of the present invention.

The following configuration parameter may be used to enable thread-local character arrays for StringBuilders and StringBuffers:

-XX:+UseTLCA

The following configuration parameter may be used to define the size of a TLCA slot, in number of characters:

-XX:TLCASlotSize=<number of characters>

The configuration parameter may be used to define the number of TLCA slots assigned to newly created Java™ threads:

-XX:NumberOfTLCASlots=<number of slots>

FIG. 5 provides an example of code that shows a StringBuilder being created recursively. In such a case (or when a StringBuffer is created recursively), having more than one TLCA slot is appropriate.

The present invention may be implemented by modifying and adding private or package-private methods and fields in classes in the java.lang package. The addition of Thread methods for borrowing and returning TLCA slots can be seen in FIG. 6. The new Thread methods may be simply declared as static (class level) but their effects are for the current thread (instance level). Note that package-private extensions do not modify the Java™ APIs.

A simple procedure may be used to enable TLCA slots for just-in-time compiled code only, as shown in FIG. 7. The Java™ interpreter will fail to borrow a TLCA slot with low overhead (no native call). Only just-in-time compiled code will try to borrow TLCA slots and has optimized code for this (C-code-based intrinsics or intermediate-representation-based intrinsics). The returning of TLCA slots works for interpreter and just-in-time compiled code (tlcaFree( ) is implemented as a native method, because a thread's TLCA area is not visible to Java™).

FIG. 8 shows the introduction of a type field class in the AbstractStringBuilder class. It is desirable not to increase the size of AbstractStringBuilder instances for this extra size. Note that under the size assumptions discussed above (see the paragraph discussing 64 bit pointers), the introduction of the new field does not increase the size of a StringBuilder or StringBuffer object. The field stores the TLCA state, capacity information, and sharing information. Note that capacity information is only required for TYPE_TLCA, so it can be stored together with the state (see FIG. 9).

FIG. 9 shows the modified constructors of the AbstractStringBuilder class. The constructor tries to borrow a TLCA slot with the specified capacity from the current thread. If the borrowing was successful, it sets the type to TYPE_TLCA and remembers the capacity. If no slot was available, the old implementation may be used and the type is set to TYPE_UNSHARED.

FIG. 10 shows the modified toString( ) method of StringBuilder and StringBuffer class.

Additional modified methods of AbstractStringBuilder, StringBuilder and StringBuffer classes include capacity( ), ensureCapacity( ), expandCapacity( ), append( ), insert( ), setCharAt( ), delete( ), and writeObject( ). Further details regarding these methods are as follows.

Regarding capacity( ) and ensureCapacity( ), one issue is that these methods bind the behavior of a StringBuilder's capacity to the contracts specified in Java™ APIs. For example, the StringBuilder(int capacity) constructor states that it "constructs a string builder with no characters in it and an initial capacity specified by the capacity argument". Similar contracts apply to other constructors and to StringBuffer. The capacity( ) method returns the current capacity. The ensureCapacity(int minimumCapacity) method ensures a certain new capacity that is calculated from the current capacity and the given minimumCapacity argument by a specific formula. In contrast to that, a StringBuilder using a TLCA internally always has a capacity that is equal to the configured TLCA size.

One solution is to mimic smaller capacities. The StringBuilder implementation remembers the initial capacity if the StringBuilder or StringBuffer uses a TLCA slot. The StringBuilder implementation returns the initial capacity when capacity( ) is called on the StringBuilder or StringBuffer. The StringBuilder implementation provides the correct capacity expansion behavior for calls to ensureCapacity( ).

Regarding expandCapacity( ), the function is to return the TLCA slot and allocate a new character array.

Regarding append( ), insert( ), setCharAt( ), and delete( ), these handle state transitions from SHARED to TLCA/UNSHARED (see FIG. 3).

Regarding writeObject, this performs a state transition from TLCA to UNSHARED (see FIG. 3). The rationale behind this is that writeObject (a function required for Java™ serialization) is typically called infrequently and exposes the internal state of the StringBuilder, so that the easiest way to provide standard compliant behavior is to fallback to original implementation.

In summary, embodiments of the present invention operate as modifications to the Java™ virtual machine and to system classes used by the Java™ virtual machine, including the following three aspects. First, TLCA slots are associated with a thread. The Java™ virtual machine 100 references the TLCA slots from the virtual machine java.lang.Thread objects. These references are not necessarily visible to Java™. The Java™ virtual machine 100 remembers which TLCA slots are free and which are borrowed. The Java™ virtual machine 100 allocates concrete TLCA slots when a Java™ thread starts (Thread.start( )).

Second, the just-in-time compiler is extended. This provides fast implementations (intrinsics) for Thread.tlcaTryAlloc( ) and Thread.tlcaFree( ).

Third, the Java™ virtual machine 100 allows the thread-local character arrays to interact with the garbage collector. The garbage collector marks TLCA slots as free if the StringBuilder or StringBuffer is reclaimed and the slots are still borrowed.

FIGS. 11A-11C and TABLES 1-3 illustrate the memory savings achieved by an embodiment of the present invention, as compared to existing string operations, with the size and platform assumptions described above (see the paragraph discussing 64 bit pointers).

FIG. 11A shows a sample of Java™ code with a simple string concatenation. FIG. 11B shows how the Java™ compiler (javac) transforms the sample code into a first transformed version. FIG. 11C shows how the Java™ compiler (javac) transforms the sample code into a second transformed version.

The abstract memory allocations of the transformed Java™ code (both for the first version and the second version) is as follows: one temporary StringBuilder object, assorted character arrays that are used by the StringBuilder internally as temporary storage, one String object for the result, and one character array used by the result string.

Regarding the assorted temporary character arrays, a StringBuilder starts with an internal character array of limited capacity (for example, 16 characters or the length of a given string plus 16 characters). If a call to append( ), insert( ), etc. exceeds the capacity of the internal character array, a new array with larger capacity (for example, 2 times the current capacity plus 2 additional characters) will be allocated and the current content is copied to the new array. These capacity expansions of the StringBuilder's internal character array consume time as well as resources.

Regarding the character array used by the result string, StringBuilders do not share their internal character array with the created result strings, and neither do StringBuffers (since Java™ 5).

TABLES 1-2 show the memory allocations of the transformed code shown in FIG. 11. TABLE 1 corresponds to the first transformed version (see FIG. 11B) and TABLE 2 corresponds to the second transformed version (see FIG. 11C). These are concrete memory allocations on a 64-bit platform using the following sample call:

String id=asIdString(10000, "com.sap.mynamespace", "myproperty");

TABLE 1

| Item | Allocations | Size |
|---|---|---|
| new StringBuilder( ) | a StringBuilder object | 32 bytes, temporary |
| | a character array with capacity 16 | 56 bytes, temporary |
| append("com.sap.my-namespace") | a character array with capacity 34 | 96 bytes, temporary |
| append(10000) | no allocation | |
| append("-") | no allocation | |
| append("myproperty") | a character array with capacity 70 | 168 bytes, temporary |
| append(10000) | no allocation | |
| toString( ); | a String object | 40 bytes, result |
| | a character array with capacity 40 | 104 bytes, result |
| Total allocated memory | | 496 bytes |
| Total allocated temporary memory | | 352 bytes |
| Total memory used for the result string | | 144 bytes |

TABLE 2

| Item | Allocations | Size |
|---|---|---|
| new StringBuilder("com.sap.my-namespace") | a StringBuilder object | 32 bytes, temporary |
| | a character array with capacity 35 | 96 bytes, temporary |
| append(10000) | no allocation | |
| append("-") | no allocation | |
| append("myproperty") | no allocation | |
| append(10000) | a character array with capacity 72 | 168 bytes, temporary |

TABLE 2-continued

| Item | Allocations | Size |
| --- | --- | --- |
| toString( ); | a String object<br>a character array with capacity 40 | 40 bytes, result<br>104 bytes, result |
| Total allocated memory | | 440 bytes |
| Total allocated temporary memory | | 296 bytes |
| Total memory used for the result string | | 144 bytes |

Note that the second transformed version (TABLE 2 and FIG. 11C) saves 56 bytes of temporary memory as compared to the first transformed version (TABLE 1 and FIG. 11B).

TABLE 3 shows the memory allocations when the sample Java™ code of FIG. 11A is executed by the Java™ virtual machine 100.

TABLE 3

| Item | Allocations | Size |
| --- | --- | --- |
| new StringBuilder( ) | a StringBuilder object<br>a TLCA slot with capacity 1012 borrowed | 32 bytes, temporary |
| append("com.sap.my-namespace") | no allocation | |
| append(10000) | no allocation | |
| append("-") | no allocation | |
| append("myproperty") | no allocation | |
| append(10000) | no allocation | |
| toString( ); | a String object<br>a character array with capacity 40<br>TLCA slot returned | 40 bytes, result<br>104 bytes, result |
| Total consumed memory | | 176 bytes |
| Total consumed temporary memory | | 32 bytes |
| Total memory used for the result string | | 144 bytes |

Note that by using the Java™ virtual machine 100 having the thread-local character arrays, the memory consumed as shown in TABLE 3 saves 320 bytes as compared to the first transformed version (TABLE 1 and FIG. 11B), and saves 264 bytes as compared to the second transformed version (TABLE 2 and FIG. 11C).

In summary, an embodiment of the present invention may have one or more of the following advantages. First, the Java™ virtual machine 100 reduces the consumed temporary memory. Only 32 bytes (i.e., the StringBuilder or StringBuffer object) of temporary memory are required on a 64-bit platform, when a TLCA slot may be borrowed and this slot is large enough for constructing the result string.

Second, the Java™ virtual machine 100 reduces the consumed time of string operations. Borrowing replaces allocations, and thread-local borrowing of TLCA slots does not introduce much overhead (e.g., no synchronization is needed). Capacity expansions (e.g., allocation of new character arrays and copying of current content) are less frequent, and may be performed only when the string construction exceeds the capacity of the borrowed TLCA slot.

Third, many code sequences (append( ), indexOf( ), insert( ), replace( ), reverse( ), substring( ), etc.) are supported with no additional impact on time and memory.

Fourth, the optimization may be implemented as part of the Java™ virtual machine and Java™ developer kit, so no changes to application coding need be required.

Finally, although the pooled TLCA slots may increase the permanent memory footprint of the Java™ virtual machine and may slow down the creation of new threads, this impact should be minimal in a server scenario with pooled threads.

FIG. 12 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of performing string operations in a virtual machine environment implemented by a computer system having a processor and a memory, comprising:
    creating, by the processor, a character array in a character array area in the memory;
    creating, by the processor, a plurality of thread-local character array areas in the memory, wherein each of the plurality of thread-local character array areas is respectively associated with a corresponding one of a plurality of threads, and wherein each of the plurality of thread-local character array areas has a plurality of character array slots;
    detecting, by the processor, a string operation that qualifies for using a thread-local character array from a thread-local character array area of the plurality of thread-local character array areas that is associated with a thread of the plurality of threads;
    borrowing, by the processor, the thread-local character array of a thread-local character array slot of the thread-local character array area;
    performing, by the processor, the string operation using the thread-local character array having been borrowed, instead of using the character array; and
    returning, by the processor, the thread-local character array to the thread-local character array slot when the string operation has been performed.

2. The computer-implemented method of claim 1, further comprising:
    copying a result of the string operation from the thread-local character array to a new array.

3. The computer-implemented method of claim 1, further comprising:
    performing a garbage collection operation to return the thread-local character array.

4. The computer-implemented method of claim 1, wherein the virtual machine environment transitions between a plurality of states, including:
    a thread-local character array state in which the virtual machine environment is performing the string operation using the thread-local character array having been borrowed;
    a shared state in which the virtual machine environment is performing the string operation using a shared character array; and
    an unshared state in which the virtual machine environment is performing the string operation using an unshared array.

5. The computer-implemented method of claim 1, wherein the virtual machine environment corresponds to a Java™ virtual machine environment.

6. The computer-implemented method of claim 1, wherein each of the plurality of thread-local character array slots points to a corresponding one of a plurality of thread-local character arrays.

7. The computer-implemented method of claim 1, wherein the string operation is one of an append operation, an indexOf operation, an insert operation, a delete operation, a replace operation, a reverse operation, and a substring operation.

8. An apparatus that executes instructions for performing string operations in a virtual machine environment, the apparatus comprising:
    a processor; and
    a memory,
    wherein the processor is configured to control the apparatus to perform processing including:
        creating, by the processor, a character array in a character array area in the memory,
        creating, by the processor, a plurality of thread-local character array areas in the memory, wherein each of the plurality of thread-local character array areas is respectively associated with a corresponding one of a plurality of threads, and wherein each of the plurality of thread-local character array areas has a plurality of character array slots,
        detecting, by the processor, a string operation that qualifies for using a thread-local character array from a thread-local character array area of the plurality of thread-local character array areas that is associated with a thread of the plurality of threads,
        borrowing, by the processor, the thread-local character array of a thread-local character array slot of the thread-local character array area,
        performing, by the processor, the string operation using the thread-local character array having been borrowed, instead of using the character array, and
        returning, by the processor, the thread-local character array to the thread-local character array slot when the string operation has been performed.

9. The apparatus of claim 8, wherein the processing further includes:
    copying a result of the string operation from the thread-local character array to a new array.

10. The apparatus of claim 8, further comprising:
    a garbage collector that performs a garbage collection operation to return the thread-local character array.

11. The apparatus of claim 8, wherein the virtual machine environment corresponds to a Java™ virtual machine environment.

12. The apparatus of claim 8, wherein the string operation is one of an append operation, an indexOf operation, an insert operation, a delete operation, a replace operation, a reverse operation, and a substring operation.

13. The apparatus of claim 8, wherein each of the plurality of thread-local character array slots points to a corresponding one of a plurality of thread-local character arrays.

14. The apparatus of claim 8, further comprising:
    a plurality of program counters stored by the memory, wherein each of the plurality of program counters is associated with a corresponding one of the plurality of threads.

15. The apparatus of claim 8, further comprising:
    a plurality of stacks, wherein each of the plurality of stacks is associated with a corresponding one of the plurality of threads.

16. The apparatus of claim 8, wherein the string operation using the thread-local character array reduces consumed temporary memory of the apparatus, as compared to the string operation using the character array.

17. The apparatus of claim 8, wherein the string operation using the thread-local character array reduces a time consumed in string operations by the apparatus, as compared to the string operation using the character array.

18. A non-transitory computer-readable medium having recorded thereon instructions that control a data processing apparatus to execute processing for performing string operations in a virtual machine environment, comprising:
    creating a character array in a character array area in a memory;
    creating a plurality of thread-local character array areas in the memory, wherein each of the plurality of thread-local character array areas is respectively associated with a corresponding one of a plurality of threads, and wherein each of the plurality of thread-local character array areas has a plurality of character array slots;

detecting a string operation that qualifies for using a thread-local character array from a thread-local character array area of the plurality of thread-local character array areas that is associated with a thread of the plurality of threads;

borrowing the thread-local character array of a thread-local character array slot of the thread-local character array area;

performing the string operation using the thread-local character array having been borrowed, instead of using the character array; and returning the thread-local character array to the thread-local character array slot when the string operation has been performed.

19. The computer-readable medium of claim 18, wherein the instructions control the data processing apparatus to execute processing further comprising:

copying a result of the string operation from the thread-local character array to a new array.

20. The computer-readable medium of claim 18, wherein the instructions control the data processing apparatus to execute processing further comprising:

performing a garbage collection operation to return the thread-local character array.

* * * * *